United States Patent
Koroteev et al.

(10) Patent No.: US 8,200,035 B2
(45) Date of Patent: Jun. 12, 2012

(54) METHOD AND APPARATUS FOR CORRECTING QUANTIZED COEFFICIENTS IN DECODER

(75) Inventors: Maxim Koroteev, Suwon-si (KR); Alexander Alshin, Suwon-si (KR); Elena Alshina, Suwon-si (KR); Vadim Seregin, Suwon-si (KR); Ekaterina Nesterova, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 917 days.

(21) Appl. No.: 12/173,366

(22) Filed: Jul. 15, 2008

(65) Prior Publication Data

US 2009/0092330 A1    Apr. 9, 2009

(30) Foreign Application Priority Data

Oct. 4, 2007    (KR) .................. 10-2007-0099883

(51) Int. Cl.
G06K 9/36 (2006.01)
G06K 9/46 (2006.01)
G06K 9/00 (2006.01)

(52) U.S. Cl. ........................ 382/251; 382/233
(58) Field of Classification Search .............. 382/232, 382/251
See application file for complete search history.

(56) References Cited

U.S. PATENT DOCUMENTS

| | | | |
|---|---|---|---|
| 5,521,718 A | 5/1996 | Eschbach | |
| 5,822,004 A | 10/1998 | Crocitti et al. | |
| 7,440,631 B2 * | 10/2008 | Battiato et al. | 382/251 |
| 7,711,199 B2 * | 5/2010 | Lee et al. | 382/251 |
| 2003/0007561 A1 | 1/2003 | Kajiwara | |
| 2006/0165163 A1 | 7/2006 | Burazerovic et al. | |
| 2006/0215917 A1 * | 9/2006 | Kimura | 382/233 |
| 2007/0160147 A1 * | 7/2007 | Kondo et al. | 375/240.18 |
| 2007/0189625 A1 | 8/2007 | Battiato et al. | |

FOREIGN PATENT DOCUMENTS

CN    1838776 A    9/2006
KR    1020070061214 A    6/2007

OTHER PUBLICATIONS

Wang, Hanli; Kwong, Sam "Novel Variance Based Approach to Improving JPEG Decoding" in: IEEE Conference on Industrial Technology (Hong Kong 2005), pp. 475-479.*

Ma, Siwei; Gao, Wen; Zhao, Debin; Lu, Yan "A Study on the Quantization Scheme in H.264/AVC and its Application to Rate Control," Advances in Multimedia Information Processing—PCM 2004 Tokyo, Springer, 2004, pp. 192-199.*

ITU-T H.264 (Mar. 2005), Series H: Audiovisual and Multimedia Systems.*

Communication dated Oct. 20, 2011 from the State Intellectual Property Office of P.R. China in counterpart Chinese application No. 200880110255.6.

* cited by examiner

*Primary Examiner* — Jason M Repko
*Assistant Examiner* — David F Dunphy
(74) *Attorney, Agent, or Firm* — Sughrue Mion, PLLC

(57) ABSTRACT

Provided are a method and apparatus for correcting quantized coefficients. In the method, statistical values of coefficients and quantized coefficients are extracted from a received video data stream, coefficient correction values for each pixel position in blocks are determined by using the statistical distribution of the coefficients depending on the statistical values, and then the coefficients are corrected by respectively adding the coefficient correction values to corresponding coefficients of respective pixel positions.

20 Claims, 4 Drawing Sheets

METHOD AND APPARATUS FOR CORRECTING QUANTIZED COEFFICIENTS IN DECODER

CROSS-REFERENCE TO RELATED PATENT APPLICATIONS

This application claims the benefit of Korean Patent Application No. 10-2007-0099883, filed on Oct. 4, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to correcting quantized coefficients in a video codec, and more particularly, to correcting coefficients that are transformed from video data in the time domain to video data in the frequency domain, and are then quantized, by using a non-uniform statistical distribution of the quantized coefficients.

2. Description of the Related Art

According to video compression standards, such as Moving Picture Experts Group (MPEG) and H.26X, a transmission data stream is generally generated by compressing video data by sequentially performing a pre-processing operation, a transformation operation, a quantization operation, and an encoding operation on the video data.

In the transformation operation, various transformation methods are used for detecting a redundancy in video data in order to increase the efficiency of compression. In particular, a method of transforming video data in the spatial domain into coefficients in the frequency domain is often used. Representative examples of such a method are discrete cosine transformation (DCT) and wavelet transformation.

In the quantization operation, the values of the obtained coefficient are reduced to effective numbers of bits, which causes a loss of the original data. Since all lossy compression techniques include the quantization operation, the rate of data compression can be increased although the original data cannot be completely restored.

In video compression standards, such as Joint Photographic Experts Group (JPEG), MPEG, and H.26X, a non-uniform quantization technique is used. In the non-uniform quantization technique, additional coefficient correction values for respective coefficients that are transformed from video data according to any transformation method, such as DCT, and are then quantized are determined, and the quantized coefficients are corrected using the additional coefficient adjustment values. Conventionally, coefficient correction values for coefficients are measured in various ways and the coefficients are corrected by an encoder.

SUMMARY OF THE INVENTION

The present invention provides a method and apparatus for correcting quantized coefficients by using a decoding terminal, thus improving compression efficiency.

The present invention also provides a method of calculating an optimal quantized coefficient correction value by using the statistical characteristics of coefficients based on a mathematical theory in order to correct coefficients that are transformed from video data in the time domain to video data in the frequency domain, and are then quantized.

According to an aspect of the present invention, there is provided a method of correcting quantized coefficients, the method comprising extracting statistical values of coefficients and quantized coefficients from a received stream of video data; determining a coefficient correction value for each pixel position in blocks by using a statistical distribution of the coefficients depending on the statistical values; and correcting the coefficients by respectively adding the coefficient correction values to corresponding coefficients of the respective pixel positions.

The method further includes dequantizing the corrected coefficients.

During the extracting of statistical values and quantized coefficients, the coefficients are obtained from the video data by an encoding terminal performing discrete cosine transformation (DCT).

During the extracting of statistical values and quantized coefficients, the statistical values are respectively allocated to the pixel positions in the blocks, and each of the statistical values is a variance of coefficients of each pixel positions in the blocks of a current frame.

The determining of coefficient correction values comprises determining each of the coefficient correction values to be proportional to a mathematical expectation in the negative direction, to be inversely proportional to a $p^{th}$ power of 2 in the negative direction if p is a quantization variable depending on qP that is a quantization parameter, and to be proportional to an absolute value of the corresponding quantized coefficient.

During the determining of coefficient correction values, the mathematical expectation is determined by selecting a Gaussian distribution as the statistical distribution and applying the variance to the Gaussian distribution.

During the determining of coefficient correction values, the mathematical expectation is determined by using a Gaussian probability density function.

During the determining of coefficient correction values, the mathematical expectation is determined by using a Laplace function.

According to another aspect of the present invention, there is provided a method of generating a video transmission data stream, the method comprising determining coefficients in a frequency domain by transforming video data, which is divided into predetermined sized blocks, into the frequency domain in units of the blocks; determining a statistical value for each pixel position in the blocks, where the same statistical value is allocated to coefficients of each pixel position; quantizing the coefficients; and recording the statistical values and the quantized coefficients in a video transmission data stream.

According to another aspect of the present invention, there is provided an apparatus for correcting quantized coefficients, the apparatus comprising an extraction unit extracting statistical values of coefficients and quantized coefficients from a received stream of video data; a coefficient correction value determination unit determining coefficient correction values for each pixel position in blocks by using a statistical distribution of the coefficients depending on the statistical values; and a coefficient correction unit correcting the coefficients by respectively adding the coefficient correction values to corresponding coefficients for the respective pixel positions.

According to another aspect of the present invention, there is provided a computer readable recording medium having recorded thereon a program for executing a method of correcting quantized coefficients.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, embodiments of a method of correcting quantized coefficients according to the present invention will be described with reference to FIGS. 1A through 3B.

Figure 1A:
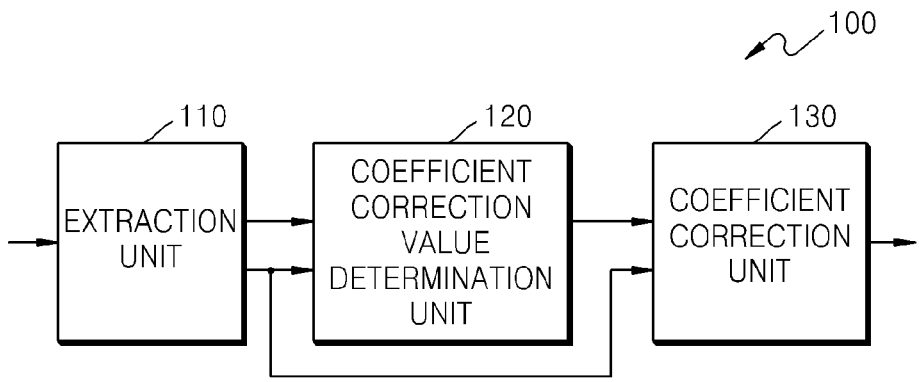
FIG. 1A is a block diagram of an apparatus for correcting quantized coefficients according to an embodiment of the present invention.

FIG. 1A is a block diagram of an apparatus 100 for correcting quantized coefficients according to an embodiment of the present invention. The correcting apparatus 100 includes an extraction unit 110, a coefficient correction value determination unit 120 and a coefficient correction unit 130.

The correcting apparatus 100 operates in a decoding terminal (not shown) and processes video data received from an encoding terminal (not shown).

The extraction unit 110 receives a video transmission data stream from the encoding terminal, extracts statistical values of coefficients and quantized coefficients from the video transmission data stream, and then transmits the statistical values and the quantized coefficients to the coefficient correction value determination unit 120 and the coefficient correction unit 130.

According to an embodiment of the present invention, the extracted quantized coefficients are obtained from the video data by the encoding terminal performing Discrete Cosine Transformation (DCT).

According to an embodiment of the present invention, the extracted statistical values are respectively given to pixel positions in a block, and each of the statistical values represents a variance of coefficients of a pixel position in each block of a current frame.

The coefficient correction value determination unit 120 receives the statistical values and the quantized coefficients from the extraction unit 110, determines coefficient correction values according to respective pixel positions by using a statistical distribution of the coefficients depending on the statistical characteristics of the coefficients, and then outputs the coefficient correction values to the coefficient correction unit 130.

According to an embodiment of the present invention, the coefficient correction value determination unit 120 determines each of the coefficient correction values to be proportional to a mathematical expectation in the negative (−) direction, to be inversely proportional to the $p^{th}$ power of 2 in the negative direction if p is a quantization variable depending on a quantization parameter aP, and to be proportional to the absolute value of a corresponding coefficient that was obtained from the video data by using time-to-frequency transformation and was then quantized.

Alternatively, the coefficient correction value determination unit 120 determines each of the coefficient correction values by using a Gaussian distribution using the variance of coefficients in the block, a Gaussian probability density function, or a Laplace function.

The method of correcting coefficients using the coefficient correction value determination unit 120 will later be described using equations described below.

The coefficient correction unit 130 receives the coefficient correction values from the coefficient correction value determination unit 120 and the coefficients from the extraction unit 110, and then corrects the coefficients by respectively adding the coefficient correction values to the corresponding coefficients for the respective pixel positions.

Figure 1B:
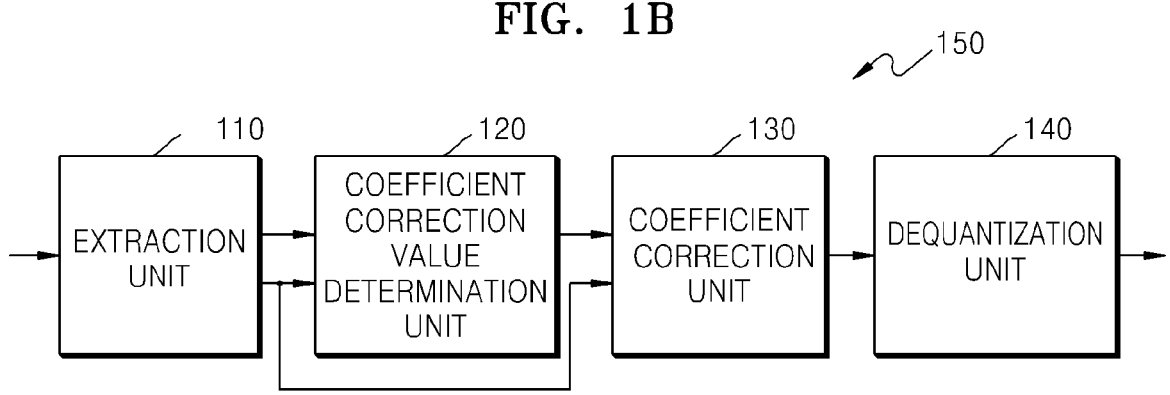
FIG. 1B is a block diagram of an apparatus for correcting quantized coefficients according to another embodiment of the present invention.

FIG. 1B is a block diagram of an apparatus 150 for corrected quantized coefficients according to another embodiment of the present invention. The correcting apparatus 150 includes an extraction unit 110, a coefficient correction value determination unit 120, a coefficient correction unit 130, and a dequantization unit 140. The operations of the extraction unit 110, the coefficient correction value determination unit 120 and the coefficient correction unit 130, are respectively the same as those of the extraction unit 110, the coefficient correction value determination unit 120 and the coefficient correction unit 130 illustrated in FIG. 1A.

The dequantization unit 140 obtains data in the time domain by dequantizing coefficients corrected by the coefficient correction unit 130. Then the original data can be restored by allowing a decoding terminal (not shown) to dequantize coefficients quantized by an encoding terminal (not shown).

Figure 2:
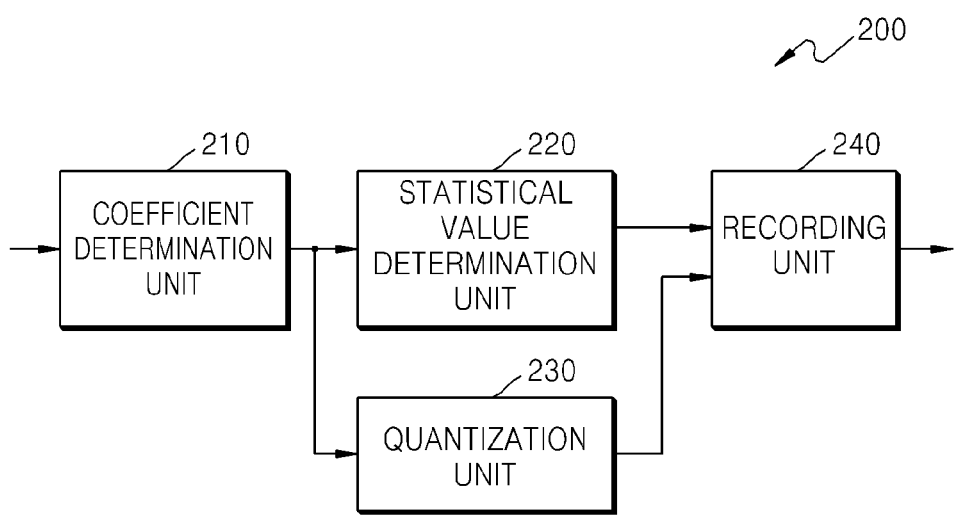
FIG. 2 is a block diagram of an apparatus for generating a video transmission data stream according to an embodiment of the present invention.

FIG. 2 is a block diagram of an apparatus 200 for generating a video transmission data stream according to an embodiment of the present invention. The generating apparatus 200 includes a coefficient determination unit 210, a statistical value determination unit 220, a quantization unit 230 and a recording unit 240.

The coefficient determination unit 210 receives video data, determines coefficients in the frequency domain by dividing the video data into predetermined sized blocks and transforming the video data into the frequency domain in the units of the blocks, and then provides the coefficients to the statistical value determination unit 220 and the quantization unit 230.

The statistical value determination unit 220 receives the coefficients from the coefficient determination unit 210, determines a statistical value for coefficients of each pixel position in a block so that the same statistical value can be allocated to each pixel position, and then outputs the determined statistical values to the recording unit 240. In other words, the same statistical value can be allocated to the same pixel position in each of the blocks.

According to an embodiment of the present invention, the statistical value determination unit 220 calculates a variance of the coefficients of each pixel position as the statistical values. The statistical values are respectively generated for the pixels and thus the total number of statistical values is equal to the total number of pixels in a block.

The quantization unit 230 receives the coefficients from the coefficient determination unit 210, quantizes them, and outputs the quantized coefficients to the recording unit 240.

The recording unit 240 receives the statistical values from the statistical value determination unit 220 and the quantized coefficients from the quantization unit 230, records the statistical values and the quantized coefficients in a video transmission data stream, and then outputs the video transmission data stream.

According to an embodiment of the present invention, the recording unit 240 records the statistical values as overhead data in the video transmission data stream.

A method of allowing the coefficient correction value determination unit 120 to determine coefficient correction values based on a statistical distribution of the coefficients depending on the statistical values of the coefficients, will now be described in detail.

An embodiment of the present invention is based on an H.264 video codec, and the H.264 video codec converts video data into coefficients in the frequency domain by performing DCT. Thus a method of determining coefficient correction values for coefficients obtained by performing DCT, that is, DCT coefficients, according to an embodiment of the present invention will now be described.

However, the following embodiment is just one embodiment of the present invention, and another type of video codec and another transformation method may be used. Thus the present invention should not be construed as being limited to the following embodiment.

In an encoding terminal of a video compression system, DCT is performed on the difference (hereinafter referred to as □the difference video□) between the original video and predicted video in units of pictures or blocks. Thus, DCT coefficients obtained by performing DCT are statistically, more decorrelated than the coefficients of the original video.

The statistical decorrelation of the DCT coefficients of the difference video means that a central limit theorem can be applied to the DCT coefficients. Since the central limit theorem is valid for the DCT coefficients, the Gaussian distribution can be applied in order to determine coefficient correction values for the respective DCT coefficients.

In an embodiment of the present invention, it is assumed that the H.264 video codec processes video data in units of 4×4 blocks. Thus, as described above, a video transmission data stream generated by the generating apparatus 200 has a statistical value for each pixel position in blocks of one frame, where the same statistical value is allocated to coefficients of each pixel position. Thus, the video transmission data stream has a total of sixteen statistical values and the same sixteen statistical values are used in each of the blocks. In particular, in a video transmission data stream according to an embodiment of the present invention, a variance of coefficients of each pixel position is recorded as a statistical value, and thus, a total of sixteen variances are recorded.

The extraction unit 110 of the correcting apparatus 100 illustrated in FIG. 1A (or the correcting apparatus 150 illustrated in FIG. 1B) extracts sixteen variances for sixteen respective pixel positions, and quantized coefficients from a received video transmission data stream. A coefficient correction value α for each pixel of a block can be calculated as follows:

$$\alpha = k - \frac{MX}{2^p}, \quad (1)$$

wherein X denotes a DCT coefficient and MX denotes a mathematical expectation of the DCT coefficient X. According to an embodiment of the present invention, each of the coefficient correction values determined by the coefficient correction value determination unit 120 is proportional to a mathematical expectation in the negative (−) direction.

Also, in Equation (1), p denotes a value depending on a quantization parameter, i.e., qP, of the H.264 video codec. The value p is set during video compression. According to an embodiment of the present invention, each of the coefficient correction values determined by the coefficient correction value determination unit 120 is inversely proportional to the $p^{th}$ power of 2 in the negative (−) direction.

k denotes the absolute value of a quantized DCT coefficient. According to an embodiment of the present invention, each of the coefficient correction values determined by the coefficient correction value determination unit 120 is proportional to the absolute value of a coefficient that was transformed from video data that underwent DCT and was then quantized.

According to an embodiment of the present invention, assuming that the distribution of DCT coefficients follows a Gaussian distribution, the coefficient correction value determination unit 120 uses the following equations in order to calculate the mathematical expectation MX:

$$1 = C\int_{-\infty}^{+\infty} p(x)dx = C\int_{(k-\frac{1}{6})2^p}^{(k+\frac{5}{6})2^p} \frac{1}{\sqrt{2\pi}\,\sigma} e^{-\frac{x^2}{2\sigma^2}} dx \quad (2A)$$

$$MX = \int_{-\infty}^{+\infty} xp(x)dx = C\int_{(k-\frac{1}{6})2^p}^{(k+\frac{5}{6})2^p} x\frac{1}{\sqrt{2\pi}\,\sigma} e^{-\frac{x^2}{2\sigma^2}} dx \quad (2B)$$

wherein C denotes an unknown constant that can be easily excluded by combining Equations (2A) and (2B).

Also, in order to calculate the mathematical expectation MX, a Gaussian probability density function expressed in the following equation can be used:

$$p(x) = \frac{1}{\sqrt{2\pi}\,\sigma} e^{-\frac{x^2}{2\sigma^2}}, \quad (3)$$

wherein σ denotes a variance. That is, a variance for each pixel position is substituted into the variance σ, Thus if Equation (1) is expressed by using a combination of Equations (2A) and (2B) and the Gaussian probability density function expressed in Equation (3), the following equation is derived:

$$\alpha = k - \frac{\sigma\left[e^{-\frac{(k-\frac{1}{3})^2 2^{2p}}{2\sigma^2}} - e^{-\frac{(k+\frac{2}{3})^2 2^{2p}}{2\sigma^2}}\right]}{2^p\sqrt{2\pi}\left\{\Phi\left(\frac{(k+\frac{2}{3})2^p}{\sigma}\right) - \Phi\left(\frac{(k-\frac{1}{3})2^p}{\sigma}\right)\right\}}, \quad (4)$$

wherein φ(•) denotes a Laplace function that can be expressed as follows:

$$\Phi(x) = \frac{1}{\sqrt{2\pi}} \int_0^x e^{-\frac{z^2}{2}} dz \quad (5)$$

It is noted from Equations (4) and (5) that a coefficient correction value α can be determined using only the variance σ of coefficients and the quantization variable p.

Figure 3A:
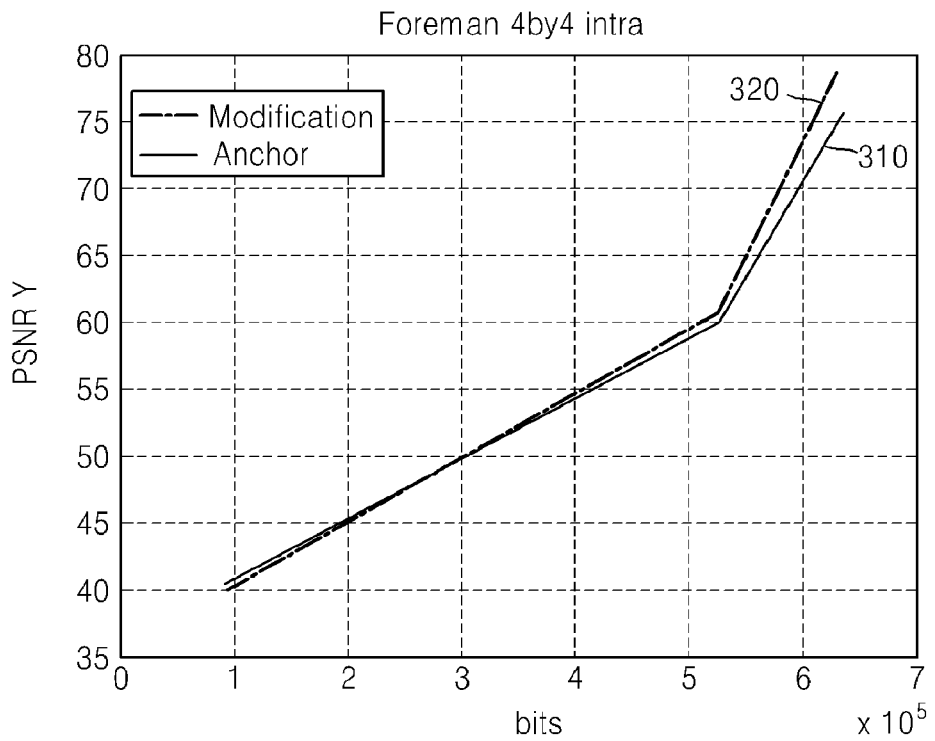
FIG. 3A is a graph illustrating a peak signal to noise ratio (PSNR) measured as a result of an experiment, according to an embodiment of the present invention.

FIG. 3A is a graph illustrating a variation in a peak signal to noise ratio (PSNR) measured as a result of an experiment, according to an embodiment of the present invention.

In detail, FIG. 3A compares the PSNR 310 of video obtained by anchor coding while correcting quantized coefficients according to a conventional method in an H.264 video codec environment with the PSNR 320 of video obtained by correcting quantized coefficients according to the present invention. In this experiment, □Foreman□video was used, and quantized coefficients were corrected by dividing the video into 4×4 blocks and using intra prediction in a H.264 video codec system.

The x-axis of the graph denotes a bit rate and the y-axis of the graph denotes the PSNR of resultant video. The PSNR 320 of the video according to the present invention is higher at the bit rate of $4 \times 10^5$ bits per second (bps), or more, than the PSNR 310 of the video according to the conventional method. That is, the present invention is more advantageous than the conventional method in terms of the rate of compression.

Figure 3B:
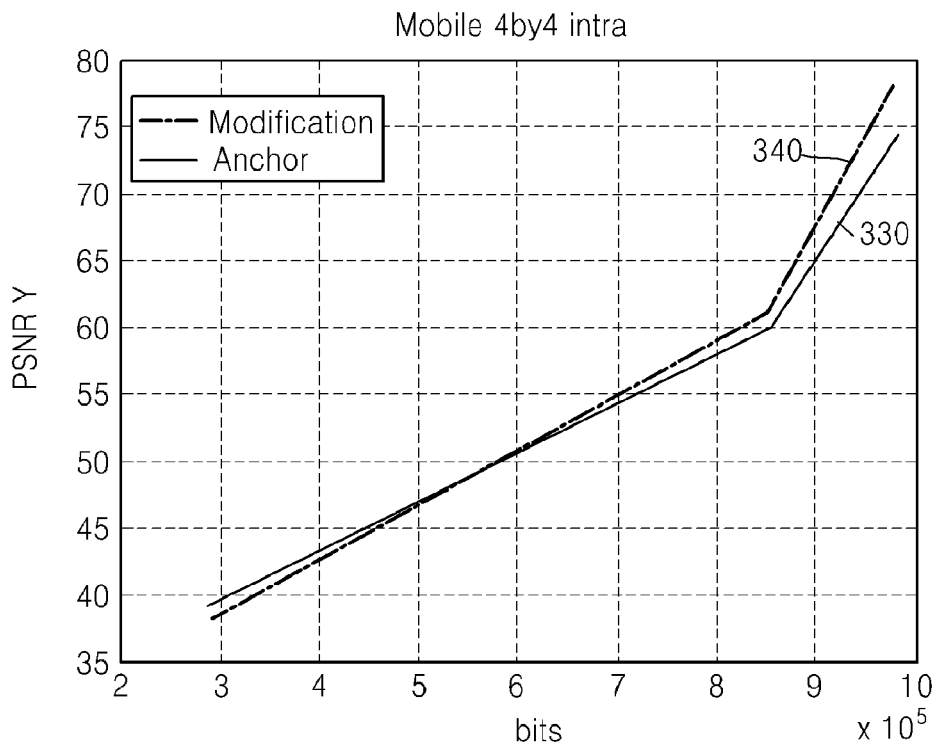
FIG. 3B is a graph illustrating a PSNR measured as a result of an experiment, according to another embodiment of the present invention.

FIG. 3B is a graph illustrating a PSNR measured as a result of an experiment, according to another embodiment of the present invention.

In detail, FIG. 3B compares the PSNR 330 of video obtained by anchor coding while correcting quantized coefficients according to a conventional method in an H.264 video codec environment with the PSNR 340 of video obtained by correcting quantized coefficients according to the present invention. In this experiment, quantized coefficient correction was performed on □mobile□video in the same environment as described above with reference to FIG. 3A.

Referring to FIG. 3B, the PSNR 340 of the video according to the present invention is higher at the bit rate of $7 \times 10^5$ bps, or more, than the PSNR 330 of the video according to the conventional method. That is, the present invention is more advantageous than the conventional method in terms of the rate of compression.

FIGS. 3A and 3B reveal that the performance of the present invention is greater at a high bit rate, i.e., when the rate of compression is high, compared to the performance of the conventional method. Also, inclusion of statistical values in a transmission data stream are more negligible or may be less influential in a high-bit rate environment than in a low-bit rate environment.

Figure 4A:
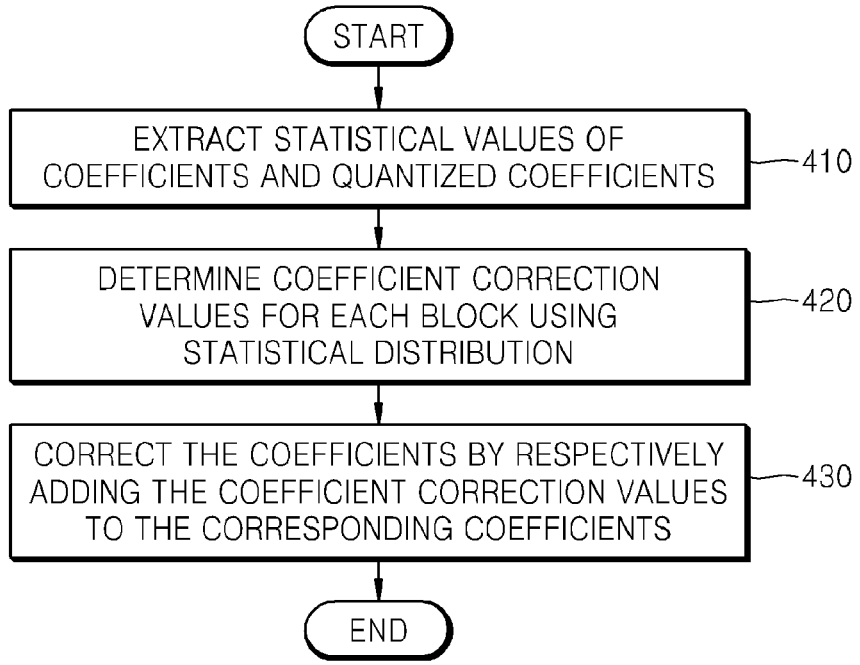
FIG. 4A is a flowchart illustrating a method of correcting quantized coefficients according to an embodiment of the present invention.

FIG. 4A is a flowchart illustrating a method of correcting quantization coefficients according to an embodiment of the present invention.

In operation 410, statistical values of coefficients and quantized coefficients are extracted from a received video data stream.

In operation 420, coefficient correction values for each pixel position in blocks are determined using a statistical distribution of the coefficients depending on statistical values.

In operation 430, the coefficients are corrected by respectively adding the coefficient correction values to the corresponding coefficients of each pixel position.

Figure 4B:
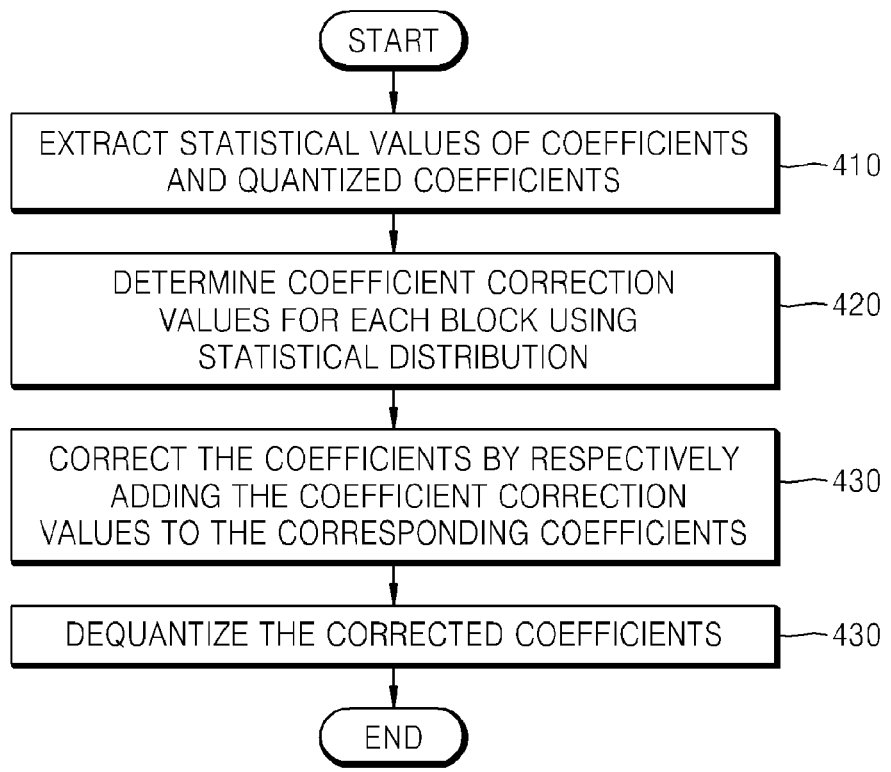
FIG. 4B is a flowchart illustrating a method of correcting quantized coefficients according to another embodiment of the present invention.

FIG. 4B is a flowchart illustrating a method of correcting quantization coefficients according to another embodiment of the present invention.

In operation 410, statistical values of coefficients and quantized

In operation 420, coefficient correction values for each pixel position in blocks are determined using a statistical distribution of the coefficients depending on statistical values.

In operation 430, the coefficients are corrected by respectively adding the coefficient correction values to the corresponding coefficients for each pixel position.

In operation 440, the corrected coefficients are dequantized.

Figure 5:
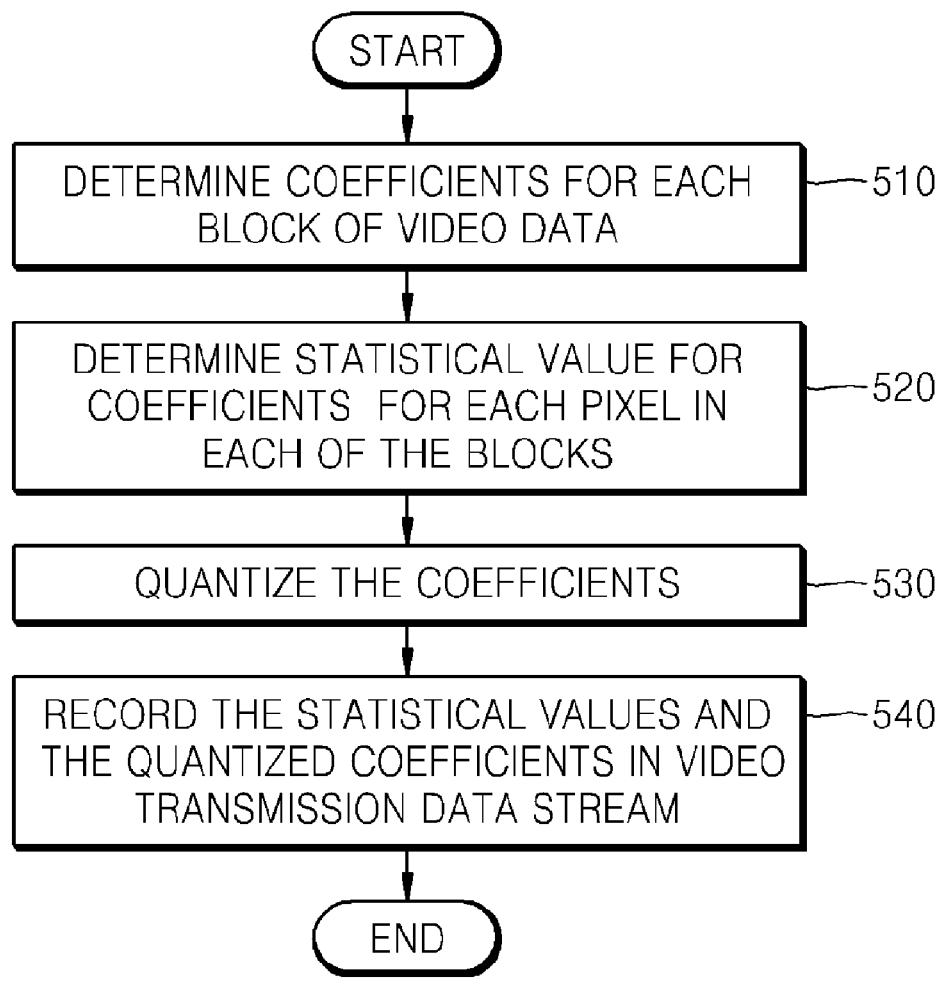
FIG. 5 is a flowchart illustrating a method of generating a video transmission data stream according to an embodiment of the present invention.

FIG. 5 is a flowchart illustrating a method of generating a video transmission data stream according to an embodiment of the present invention.

In operation 510, video data that is divided into predetermined sized blocks is transformed into the frequency domain in units of the blocks in order to determine coefficients in the frequency domain.

In operation 520, a statistical value for coefficients of each pixel position in the blocks is determined.

In operation 530, the coefficients are quantized.

In operation 540, the statistical value for each pixel position and the quantized coefficients are recorded in a video transmission data stream.

The method and apparatus for correcting quantized coefficients according to the present invention are capable of improving the efficiency of compression in a high bit-rate environment by allowing a decoding terminal to correct quantized coefficients.

Also, in the method of correcting quantized coefficients, it is possible to realize an optimized method of correcting coefficients by calculating quantization coefficient correction values for coefficients by using statistical characteristics of the coefficients based on a mathematical theory.

The above embodiments of the present invention may be embodied as a computer program that can be executed in a computer. The computer program may be stored in a computer readable medium, and executed using a computer. Examples of the computer readable medium include a magnetic recording medium (a ROM, a floppy disk, a hard disc, etc.), an optical recording medium (a CD-ROM, a DVD, etc.). Examples of other computer readable medium include carrier waves (such as in transmission over the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of correcting quantized coefficients, the method comprising:
   receiving a stream of video data, the video data comprising statistical values of coefficients and quantized coefficients;
   extracting the statistical values of coefficients and the quantized coefficients from the received stream of video data;
   determining coefficient correction values for pixel positions in blocks by using a statistical distribution of the quantized coefficients based on the statistical values; and
   correcting the quantized coefficients by adding the coefficient correction values to the quantized coefficients at corresponding pixel positions,
   wherein the determining of coefficient correction values comprises determining each of the coefficient correction values to be proportional to a statistical characteristic of the quantized coefficients in a negative direction and to be proportional to an absolute value of a corresponding quantized coefficient.

2. The method of claim 1, further comprising dequantizing the corrected quantized coefficients.

3. The method of claim 1, wherein during the extracting of statistical values and quantized coefficients, the quantized coefficients are obtained from the video data by performing discrete cosine transformation (DCT) at an encoding terminal.

4. The method of claim 1, wherein during the extracting of statistical values and quantized coefficients, the statistical values are allocated to the pixel positions in the blocks, respectively, and the statistical values are variances of quantized coefficients of corresponding pixel positions in the blocks of a current frame.

5. The method of claim 4, wherein the determining of coefficient correction values comprises determining one of the coefficient correction values to be proportional to a mathematical expectation in a negative direction, to be inversely proportional to a $p^{th}$ power of 2 in the negative direction if p is a quantization variable depending on qP that is a quantization parameter, and to be proportional to an absolute value of a corresponding quantized coefficient.

6. The method of claim 5, wherein during the determining of coefficient correction values, the mathematical expectation is determined by selecting a Gaussian distribution as the statistical distribution and applying the variances of quantized coefficients of corresponding pixel positions in the blocks of a current frame to the Gaussian distribution.

7. The method of claim 5, wherein during the determining of coefficient correction values, the mathematical expectation is determined by using a Gaussian probability density function.

8. The method of claim 5, wherein during the determining of coefficient correction values, the mathematical expectation is determined by using a Laplace function.

9. A method of generating a video transmission data stream, the method comprising:
   determining coefficients in a frequency domain by transforming video data which is divided into blocks of predetermined size, into a frequency domain in units of the blocks;
   determining statistical values for pixel positions in the blocks, a same statistical value being allocated to coefficients in same pixel positions in the blocks;
   quantizing the coefficients; and
   recording the statistical values and the quantized coefficients in a video transmission data stream,
   wherein the statistical values are used by allowing a decoding terminal to determine coefficient correction values for pixel positions in blocks to correct the quantized coefficients, and
   wherein each of the coefficient correction values is determined by the decoding terminal to be proportional to a statistical characteristic of the quantized coefficients in a negative direction and to be proportional to an absolute value of a corresponding quantized coefficient.

10. An apparatus for correcting quantized coefficients, the apparatus comprising:
    an extraction unit which receives a stream of video data, the video data comprising statistical values of coefficients and quantized coefficients, and extracts the statistical values of coefficients and the quantized coefficients from the received stream of video data;
    a coefficient correction value determination unit which determines coefficient correction values for pixel positions in blocks by using a statistical distribution of the coefficients, based on the statistical values; and
    a coefficient correction unit which corrects the coefficients by adding the coefficient correction values to corresponding coefficients at corresponding pixel positions,
    wherein the determining of coefficient correction values comprises determining each of the coefficient correction values to be proportional to a statistical characteristic of the quantized coefficients in a negative direction and to be proportional to an absolute value of a corresponding quantized coefficient.

11. The apparatus of claim 10, further comprising a dequantization unit which dequantizes the corrected coefficients.

12. The apparatus of claim 10, wherein the coefficients are obtained from the video data by an encoding terminal which performs discrete cosine transformation (DCT) at an encoding terminal.

13. The apparatus of claim 10, wherein the statistical values are allocated to the respective pixel positions in the blocks, and the statistical values are variances of coefficients of corresponding pixel positions in the blocks of a current frame.

14. The apparatus of claim 13, wherein the coefficient correction value determination unit determines one of the coefficient correction values to be proportional to a mathematical expectation in a negative direction, to be inversely proportional to a $p^{th}$ power of 2 in the negative direction if p is a quantization variable depending on qP that is a quantization parameter, and to be proportional to an absolute value of a corresponding quantized coefficient.

15. The apparatus of claim 14, wherein the coefficient correction value determination unit determines the mathematical expectation by selecting a Gaussian distribution as the statistical distribution and applying the variance to the Gaussian distributions.

16. The apparatus of claim 14, wherein the coefficient correction value determination unit determines the mathematical expectation by using a Gaussian probability density function.

17. The apparatus of claim 14, wherein the coefficient correction value determination unit determines the mathematical expectation by using a Laplace function.

18. An apparatus for generating a video transmission data stream, the apparatus comprising:
    a coefficient determination unit which determines coefficients in a frequency domain by transforming video data which is divided into blocks of predetermined size, into the frequency domain in units of the blocks;
    a statistical value determination unit which determines statistical values for pixel positions in the blocks, a same statistical value being allocated to coefficients in same pixel positions in the blocks;
    a quantization unit which quantizes the coefficients; and
    a recording unit which records the statistical values and the quantized coefficients in a video transmission data stream,
    wherein the statistical values are used by allowing a decoding terminal to determine coefficient correction values for pixel positions in blocks to correct the quantized coefficients, and
    wherein each of the coefficient correction values is determined by the decoding terminal to be proportional to a statistical characteristic of the quantized coefficients in a negative direction and to be proportional to an absolute value of a corresponding quantized coefficient.

19. A non-transitory, tangible computer readable recording medium having recorded thereon a program for executing the method of correcting quantized coefficients, the method comprising:
    receiving a stream of video data, the video data comprising statistical values of coefficients and quantized coefficients;

extracting the statistical values of coefficients and the quantized coefficients from the received stream of video data;

determining coefficient correction values for pixel positions in blocks by using a statistical distribution of the coefficients based on the statistical values; and correcting the coefficients by adding the coefficient correction values to coefficients at corresponding pixel positions, wherein the determining of coefficient correction values comprises determining each of the coefficient correction values to be proportional to a statistical characteristic of the quantized coefficients in a negative direction and to be proportional to an absolute value of a corresponding quantized coefficient.

20. A non-transitory, tangible computer readable recording medium having recorded thereon a program for executing the method of generating a video transmission data stream, the method comprising:

determining coefficients in a frequency domain by transforming video data which is divided into blocks of predetermined size, into a frequency domain in units of the blocks;

determining statistical values for pixel positions in the blocks, a same statistical value being allocated to coefficients in same pixel positions in the blocks;

quantizing the coefficients; and recording the statistical values and the quantized coefficients in a video transmission data stream, wherein the statistical values are used by allowing a decoding terminal to determine coefficient correction values for pixel positions in blocks to correct the quantized coefficients, and wherein each of the coefficient correction values is determined by the decoding terminal to be proportional to a statistical characteristic of the quantized coefficients in a negative direction and to be proportional to an absolute value of a corresponding quantized coefficient.

* * * * *